Dec. 5, 1950  D. M. SIMPSON  2,532,520
NONOVERFILL INDICATOR FOR BATTERY CELLS
Filed Dec. 24, 1947
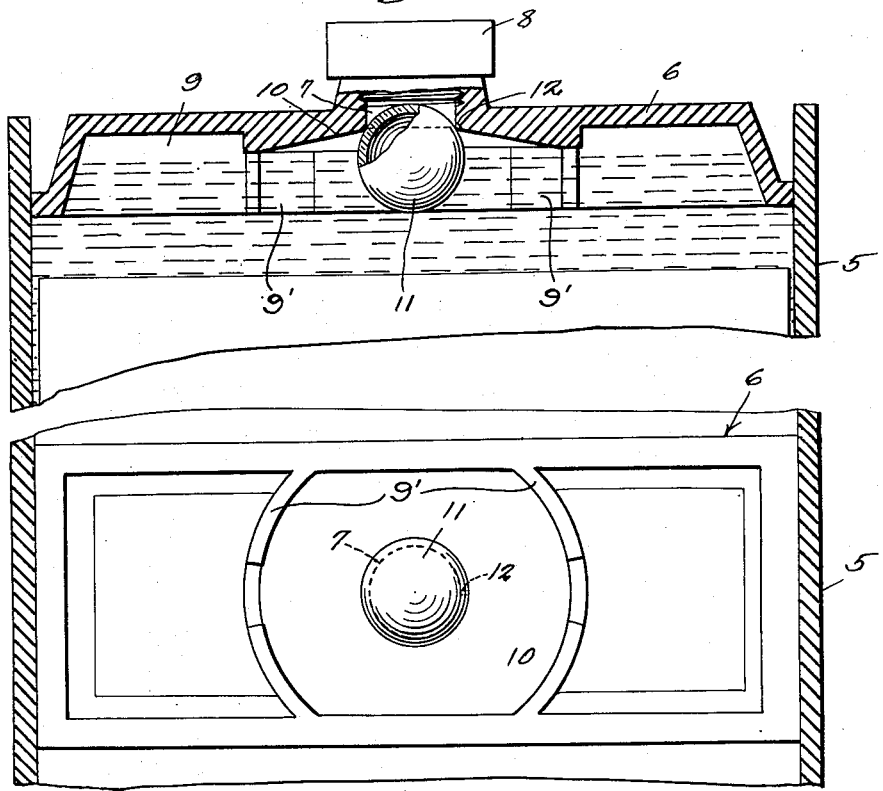
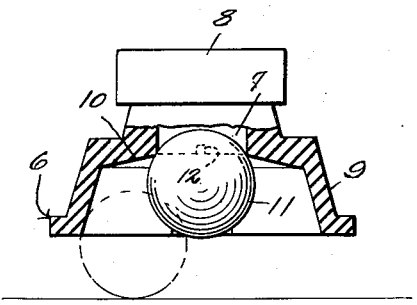
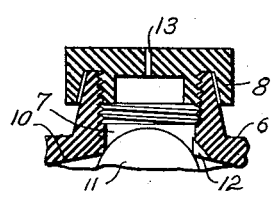
D. M. Simpson
INVENTOR
BY  C. A. Snow & Co.
ATTORNEYS.

Patented Dec. 5, 1950

2,532,520

UNITED STATES PATENT OFFICE 2,532,520

NONOVERFILL INDICATOR FOR BATTERY CELLS

David M. Simpson, Long Beach, Calif.

Application December 24, 1947, Serial No. 793,607

1 Claim. (Cl. 136—182)

This invention relates to an indicating device designed for use with battery cells, providing means for indicating when sufficient water has been added to properly fill the cell.

An important object of the invention is to provide an indicator of this character including a float in the form of a sphere, the float being colored a distinctive color so that it may be readily viewed through the filling opening of the battery.

Another object of the invention is to construct the battery top in such a way that the float will move to its uppermost position when the level of the water within the battery cell reaches a predetermined point in spaced relation with the top to insure against the water and acids overflowing at the filling opening.

Another important object of the invention is to provide a battery top with inclined inner surfaces that extend to the filling opening so that a spherical float within the cell will be directed upwardly closing the filling opening, the float being moved laterally to permit the introduction of a hydrometer syringe nozzle for the purpose of testing the gravity of the electrolyte, the float returning to its position directly under the opening, closing the opening when the nozzle of the hydrometer is removed.

Still another object of the invention is to provide a battery top wherein a float is provided the float rising within the battery top as the water is being added to the cell, the amount of water in the cell being indicated by the position of the float, and when sufficient water has been added the float has risen to the highest position in the vent.

A further object of the invention is the provision of openings to permit the gassing of the battery to exhaust from the battery, the float maintaining the filling opening substantially closed.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a vertical sectional view through the upper portion of a battery case, the battery top being constructed in accordance with the invention.

Fig. 2 is a bottom plan view of the battery top, the filling opening closed by the float.

Fig. 3 is a sectional view taken at right angles to Fig. 1.

Fig. 4 is a sectional view through the vent cap, illustrating the vent notch in the wall of the cover on an enlarged scale.

Referring to the drawing in detail, the reference character 5 indicates a battery case of which the battery 6 forms a part, the battery top having the usual filling opening 7 formed therein, the filling opening being closed by means of the usual cap 8, having the usual vent opening.

As clearly shown by the drawing, the battery top or cover is provided with spaced parallel flanges 9 that extend an appreciable distance along the center of the top or cover 6, the flanges being inclined slightly outwardly.

The surface of the battery top or cover 6 between the sides 9 at the center thereof and within the confines of the annular flange 9', is slightly inclined as at 10 towards the filling opening 7, the inclined surfaces being provided to direct the ball float 11 towards the filling opening 7 as the water level in the battery rises during the filling of the battery.

A notch 12 is formed at the base of the filling opening 7, providing a vent for gases which are generated within the battery during the filling or charging operation.

The ball float 11 is colored a distinctive color so that it may be readily viewed through the filling opening 7 to determine the water level within the battery.

It is obvious that when the water level within the battery is below a predetermined line, the ball float will recede from its position within the lower end of the filling opening 7, which is of a diameter less than the diameter of the ball.

When adding water to the cell, the water level rising in the cell will cause the ball float to move upwardly indicating the amount of water in the cell.

From the foregoing it will be seen that due to the construction shown and described, I have provided an indicator for use in connection with battery covers, whereby it will be possible to readily determine the water level within the battery.

It will also be obvious that when recharging batteries equipped with the indicating device constructed in accordance with the present invention, the caps of the battery cells may be removed during the charging operation, the ball float acting to substantially close the filling openings of the cells. The hydrometer nozzle used in making readings during charging of the battery and when the caps 8 are removed, may be readily inserted without the necessity of unscrewing the battery caps, the ball floats of the battery cells being pushed laterally by the nozzle of the hydrometer used in making the readings, the ball floats immediately assuming their closed positions when the hydrometer nozzle has been removed.

Having thus described the invention, what is claimed is:

A storage battery including a cover, having a filling opening, a depending annular flange formed on the inner surface of the cover surrounding the filling opening, said flange having slots extending inwardly from the free edge thereof, terminating at the base of the annular flange, the inner edge of the filling opening being formed with a notch, where gases escape from the battery, the inner surface of the cover within the confines of the annular flange being inclined upwardly from said annular flange towards the filling opening, and a ball float disposed within the space formed by the annular flange for engagement with the inner edge of the wall of the filling opening, substantially closing the filling opening, said ball extending through the filling opening with its upper edge flush with the top of the storage battery.

DAVID M. SIMPSON.

REFERENCES CITED

The following references are of record in the file of this patent:

UNITED STATES PATENTS

| Number | Name | Date |
| --- | --- | --- |
| 1,491,143 | Kerr | Apr. 22, 1924 |
| 2,375,406 | Drown | May 8, 1945 |

FOREIGN PATENTS

| Number | Country | Date |
| --- | --- | --- |
| 17,308 | Great Britain | of 1910 |

OTHER REFERENCES

Scientific American, Feb. 1934, vol. 150, No. 2, page 99.